(12) United States Patent
Hatami

(10) Patent No.: US 7,882,040 B2
(45) Date of Patent: Feb. 1, 2011

(54) METHOD FOR COMPUTER SERVER OPERATION

(75) Inventor: Yasser Hatami, London (GB)

(73) Assignee: Gulf Talent FZ-LLC, Dubai, Arab Emirates ( * ) Notice: Subject to any disclaimer, the term of this patent is extended or adjusted under 35 U.S.C. 154(b) by 1205 days.

(21) Appl. No.: 11/444,178

(22) Filed: May 31, 2006

(65) Prior Publication Data

US 2007/0282620 A1    Dec. 6, 2007

(51) Int. Cl.
*G06Q 99/00* (2006.01)
(52) U.S. Cl. .......................................... 705/321; 705/1.1
(58) Field of Classification Search .................. 705/321
See application file for complete search history.

(56) References Cited

U.S. PATENT DOCUMENTS

| | | | |
|---|---|---|---|
| 6,687,560 B2 * | 2/2004 | Kiser et al. ................ | 700/108 |
| 6,904,407 B2 * | 6/2005 | Ritzel ......................... | 705/1.1 |
| 2003/0037032 A1 * | 2/2003 | Neece et al. ................ | 707/1 |
| 2003/0200136 A1 * | 10/2003 | Dewar ........................ | 705/11 |
| 2004/0186852 A1 * | 9/2004 | Rosen ..................... | 707/104.1 |
| 2004/0210661 A1 * | 10/2004 | Thompson .................. | 709/228 |
| 2005/0033633 A1 * | 2/2005 | LaPasta et al. ............... | 705/11 |
| 2006/0212476 A1 * | 9/2006 | Bogle et al. ............... | 707/104.1 |
| 2006/0235884 A1 * | 10/2006 | Pfenninger et al. ........ | 707/104.1 |
| 2006/0265270 A1 * | 11/2006 | Hyder et al. .................. | 705/9 |
| 2007/0094264 A1 * | 4/2007 | Nair ............................. | 707/9 |
| 2007/0245245 A1 * | 10/2007 | Blue et al. .................. | 715/739 |
| 2008/0155686 A1 * | 6/2008 | McNair ....................... | 726/21 |

* cited by examiner

*Primary Examiner*—Jonathan Ouellette

(57) ABSTRACT

A method of operating an online recruitment management site, such as an employment recruitment site, includes the steps of capturing information of reference providers provided by a candidate and sending the reference providers an invite to accept to be reference providers for the candidate. After the reference providers accept the invitation and verify their information, their names and information are automatically added to the candidate's profile for potential recruiters, e.g. employers, to view. The reference providers also have the opportunity to enter evaluations regarding the candidate on the site. The reference providers' evaluations are readily and conveniently available for the recruiters to view and assess the candidate's suitability for the recruited position during their initial screening and selection period. After the reference providers have accepted or declined to be reference providers for the candidate, the site invites the reference providers to participate as candidates or recruiters on the site. To participate as candidates, the reference providers may register their C.V. or search job opportunities on the site. To participate as recruiters, they may post job openings or search for candidates who have registered on the site.

18 Claims, 8 Drawing Sheets

FIG. 2

References

Details of up to 3 individuals who can provide references on your professional background – ideally former employers. (Completing this feature is highly recommended, as some employers only consider candidates with confirmed references.)

Note: they will receive an email asking them to confirm. (What they will see)

| Full Name (e.g Mr. John Smith) | Position | Company | Email Address | Relationship with you (Current or Previous) |
|---|---|---|---|---|
|  |  |  |  | ----Select---- |
|  |  |  |  | ----Select---- |
|  |  |  |  | ----Select---- |

[Invite References]

FIG. 3

Dear [reference provider's name]: ——301

[Candidate] has registered his CV on GulfTalent.com, Middle East's leading recruitment website for mid to senior level professionals. He has provided your contact as a respected individual who could provide a professional reference for him.

He is asking if you would accept his request to be mentioned as one of his references. For further details, please click here. —— 304

Kind Regards,
[Recruitment Management Site]

— 300
302 { (first paragraph)
303 { (closing)

FIG. 8

Reference Questionnaire                                801

Basic Facts

802

1. How long have you known the candidate?
   - Personally: <u>YEARS</u> years
   - Professionally: <u>YEARS</u> years 2. What was your relationship with the candidate?
   - Supervisor / Manager
   - Colleague
   - Client / Business Partner
   - Tutor / Professor
   - Friend or Family 3. In which period did the candidate work at your company/organization?
   From <u>MONTH, YEAR</u> to <u>MONTH, YEAR</u>

4. What was the candidate's position/job title at the time he/she left your company?
   _____

5. What reason did the candidate give for leaving? _____
   _____

Professional Assessments

803

6. To the best of your knowledge has this candidate ever been guilty of unprofessional conduct, dishonest practice, incompetence, or fraud?
   - No
   - Yes (Please explain in comments section below)

7. Would you recommend this candidate for a position with another employer?
   - Recommend highly; without reservation
   - Recommend as qualified and competent
   - Recommend with some reservation (Please explain in comment section below)
   - Do not recommend (Please explain in comment section below)

8. Would you rehire this person?
   - Yes
   - No (Please explain in comments section below)

9. Additional comments/explanations: _____
   _____
   _____
   _____

804   I confirm that the above recommendation is based on my best judgment, and to the best of my knowledge is true and fair.

SUBMIT
805

METHOD FOR COMPUTER SERVER OPERATION

FIELD OF INVENTION

The present invention relates to a method of operating an online recruiting management site, such as an employment recruitment site.

BACKGROUND OF THE INVENTION

Online recruiting management sites are venues for parties who offer opportunities and parties who search for opportunities to present what they have and find what they seek. Parties who offer opportunities include, among others, any kind of employers, executive recruiters (a.k.a. "head hunters"), or recruiting agents. The opportunities that they offer may be for employment, types of services, or other types of positions, such as military, charity, or volunteer recruitment. Parties that recruit for available positions or for providing a service shall be referred hereinafter as "recruiters." Parties who search for opportunities on the recruiting management sites will be referred hereinafter as "candidates." On the recruiting management sites, candidates for employment may search for available positions posted by recruiters. The employment candidates also have the opportunity to post their own resumes, names of reference providers, and other personal information for recruiters to view and assess their qualifications.

Some recruitment sites are also set up to automatically send alert email messages to registered candidates of new positions that satisfy the criteria chosen by the candidates or which match the profiles of the candidates. Similarly, on these recruitment management sites, recruiters post available positions for employment candidates to view. They also use the sites to search for candidates whose resumes or profiles have qualifications that fit what they are looking for. On some sites, recruiters may also set up automated alerts such that when a candidate with a specific profile that matches what the recruiters are looking for joins the site, the recruiters will be notified. After the recruiters have found suitable candidates from the sites, they can contact the candidates to set up interviews.

After the interviews, the recruiters will narrow down the number of candidates to a few for employment considerations. The recruiters also often contact the reference providers provided by the candidates to assess the candidates' characters and qualifications. They can contact the reference providers by phone, fax or email. Sometimes the recruiters may not be able to communicate with the reference providers because either the phone numbers or email addresses are inaccurate. Other times it may take the recruiters several attempts to get a hold of the reference providers. Moreover, the recruiters' interviews with different reference providers may not be consistent because the recruiters may not ask the same questions to all reference providers. Finally, after each interview, the recruiters may have to write a report of the interview; the reports may not accurately reflect what the reference providers have communicated. After going through all the steps to obtain a reference report on all candidates, the recruiters will feel that the reference checking process is time consuming, inconvenient and sometimes frustrating.

Furthermore, the reference checking process is done very late in the hiring process, which is typically at the time the employers are about to hire a certain candidate. If, through the interviews with the reference providers, the employers uncover some aspects of the candidate that they do not like, they may have to go back to the candidate pool to choose another employment candidate and check that candidate's reference providers. That process, again, delays the hiring process and is inconvenient to the recruiters. Ideally, reference checking should be done early in the hiring process, such as during the initial screening and selection period.

Currently there is no recruitment system that allows recruiters to conveniently view a candidate's profile and instantly view reference data, such as evaluations, from the reference providers of the candidate. U.S. Pat. No. 6,904,407 ("Ritzel") discloses an online repository service for a candidate's reference providers to store their reference data. However, recruiters may not find Ritzel very convenient for the following reasons. In Ritzel, a candidate's reference providers log into the repository website to enter the reference data, such as evaluations, about the candidate. The candidate who wants to provide reference data to a recruiter would refer the recruiter to the repository website with a personal account number. After the recruiter visits the website and logs in using the given account number, the recruiter is able to see a list of names of reference providers for the candidate. However, in order to read the evaluations, the recruiter must first click on the names of the reference providers and go through a purchasing process. After paying a fee and providing some personal information, the repository service sends the recruiter an email that contains the reference data. In order to read the reference data, the recruiter must access his email account and retrieve the email. In summary, the recruiter must go through many steps to be able to read the reference providers' reference data. The system, therefore, is not very convenient for recruiters because it does not allow recruiters to have a direct access to the reference data provided by the reference providers.

U.S. Patent Application Publication 2005/0033633 ("LaPasta") discloses a method for evaluating job candidates. In LaPasta, the system sends emails to reference providers to complete survey questions regarding a job candidate. After receiving the answers from the reference providers, the system decouples the names from the data to ensure anonymity, combines the data from different reference providers together and generates a confidential data report for an employer to view. Therefore, with LaPasta, the employer is not able to see which reference provider says what about the candidate or to contact the reference provider directly for further data.

Accordingly, there is a need for a recruitment system that further cuts down the steps that a recruiter has to go through to read what reference providers say about a candidate and is integrated into the recruitment system. There is also a need for a recruitment system that allows the recruiter to see the name of a particular reference provider on the candidate's profile and be able to read exactly what that reference provider says about the candidate.

Another challenge facing online recruitment sites is in the marketing area of the sites. Recruitment sites want to have an impressive database with a great number of high quality candidates to attract potential employers. However, they generally rely on traditional marketing strategies such as online and offline advertising and public relations campaigns. These strategies are expensive. In addition, they generally indiscriminately attract a large number of unsuitable candidates to the site along with the suitable ones. The large number of unsuitable candidates not only represents a waste of advertising dollars but also makes it more difficult for employers to see and narrow in on the few that do actually qualify. Having a large number of unsuitable candidates actually diminishes the value of the sites and the online recruitment experience for recruiters.

Therefore, there is a need for a low-cost marketing method that attracts high quality and suitable candidates to a recruitment website.

SUMMARY OF THE INVENTION

A method for operating a recruitment management system is provided. The method includes the steps of allowing a candidate, such as an employment candidate, to provide the system with names and contact information of reference providers. The system then automatically checks to ensure that the format of the entered information is correct. The system then sends the reference providers invitations to accept to be reference providers for the candidate. The reference providers can visit a website of the recruitment management site to formally accept to be reference providers, verifies their contact information, and enters evaluations or reference data of the candidate. After the reference providers have accepted to be reference providers for the candidate, the system adds the reference providers' names and contact information to the candidate's profile for potential recruiters to view. If there are reference providers' reference data, the system provides a link from the reference providers' contact information on the candidate's profile to the stored reference data. That link allows the recruiters to conveniently view the reference data in order to assess the candidates' qualifications. After the reference providers have finished with the process, the system sends the candidate a notice that the reference providers have accepted to be reference providers for the candidate. The system also sends the reference providers a notice that they have been added as reference providers on the candidate's profile. One advantage of such a method is that it saves the recruiters time and energy from calling a candidate's reference providers. Another advantage is it also allows the recruiters to see what the reference providers say about the candidate early in the screening and selection process. The convenience of viewing the reference providers' evaluations will attract more potential employers to use the recruitment management site. Additionally the option of contacting the reference provider directly is also available.

Another aspect of the invention includes a step of inviting the reference providers to participate on the site as candidates or search for advertised positions on the site. This step gives the reference providers a powerful incentive to participate as candidates or search for advertised positions on the site. Furthermore, because the reference providers are usually former supervisors of the candidates, they usually have higher quality than the candidates. Accordingly, the reference providers' participation on the site as candidates will increase the quality of the candidates on the site. Once they participate as candidates on the site, they will also offer new reference providers who are likely their former supervisors or coworkers with equal or higher quality. The new reference providers will then be invited to participate as candidates on the site. Such a continual inviting process provides a method for continually increasing the number of high quality candidates on the recruitment site. In addition to the options of either participating on the site as a candidate or searching for advertised positions on the site, the reference providers also have the option of participating on the site as recruiters. The reference providers may post job openings or search for employment candidates who have registered in the database of the site.

BRIEF DESCRIPTION OF THE DRAWINGS

FIG. 2 is an exemplary form for a candidate to enter prospective reference providers' information.

FIG. 3 is an exemplary email invitation sent to prospective reference providers.

FIG. 8 is an exemplary web page showing options for a reference provider to enter reference data regarding the candidate.

DETAILED DESCRIPTION OF THE INVENTION

Figure 1:
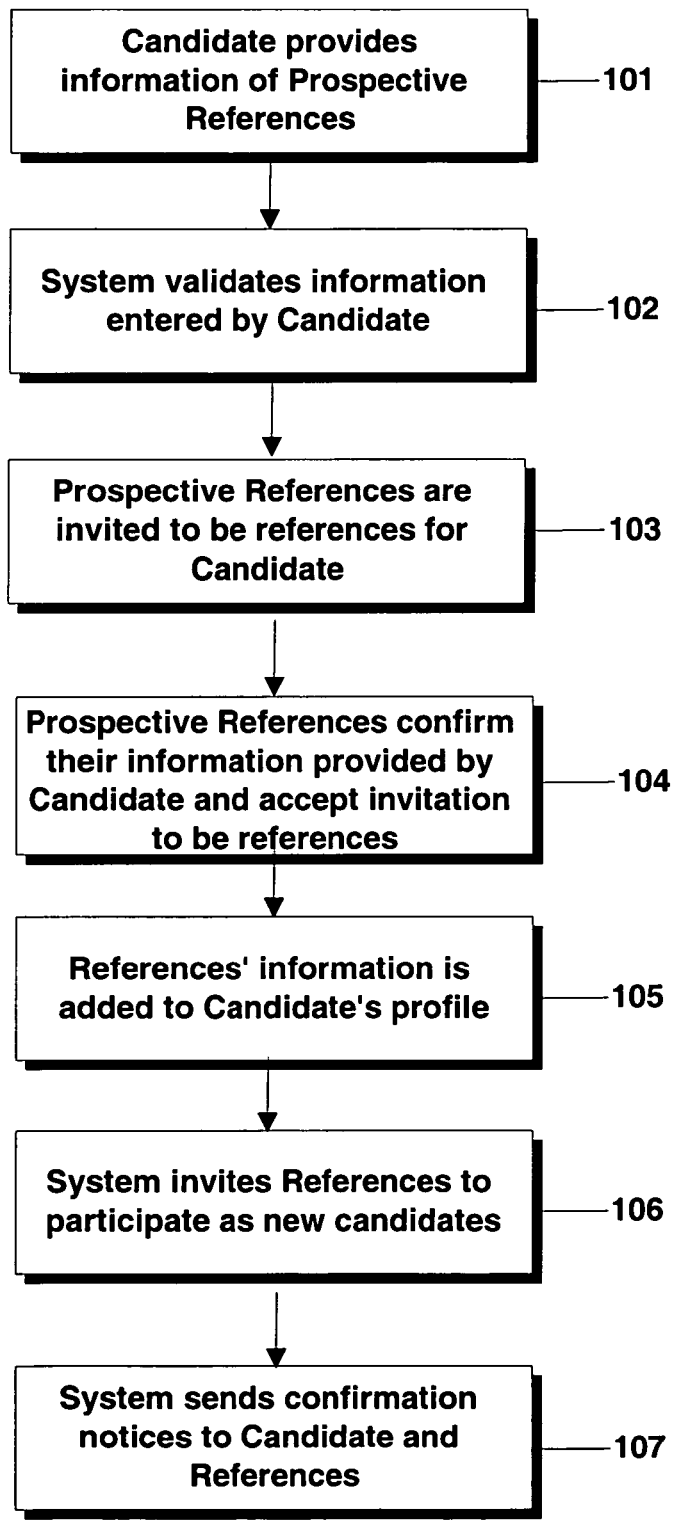
FIG. 1 is flowchart of an exemplary method according to one embodiment of the present invention.

FIG. 1 illustrates a flowchart of an exemplary method of operating an online recruitment management site according to one embodiment of the invention. The site is a network accessible computer server that is operated by a recruitment management system. In accordance with this example, the computer server provides a recruitment website accessible from the Internet. Although the invention is described with regard to employment recruitment, it should be readily understood that the inventive method is likewise usable for other recruitment services including, for example, armed forces, vocational schools, and construction contracting business. It can also be used for other applications where a party is to be selected on the basis of their credentials, including testimony from another party who has interacted with them previously. Examples of this could include: selecting a company as service provider and seeking reference providers from their previous clients who could then be asked to sign up as service providers themselves.

Furthermore, for convenience, those who have or may have opportunities to offer to others, such as employers, executive recruiters (a.k.a. "head hunters"), or recruiting agents, among others, will be referred hereinafter as "recruiters" and those who search for opportunities such as job, service, or other types of positions will be referred hereinafter as "candidates." Although the opportunities being offered or recruited for can be any type of positions and services, the detailed description of the invention below will be based on employment opportunities.

The method begins with step 101 where a candidate provides the system with names and information of individuals who would be reference providers for the candidate. This step is usually done during or after the candidate has already established a profile on the recruitment site. A recruitment site may have any suitable method to allow a candidate to register into the system and establish a profile. To create a profile on the site, a system usually allows the candidate to enter the name and contact information of the candidate. It also allows the candidate to either create or upload a curriculum vitae ("C.V.") or resume for recruiters, such as employers, to view and access the candidate's qualifications. Usually, the candidate is allowed to edit the profile at any time.

Referring again to step 101, during this step, the candidate provides the system with names and information of prospective reference providers. For instance, the system may present to the candidate a form for the candidate to enter names and information of individuals who are willing to provide reference data on the candidate's characters, qualifications, and employment history. Specifically, the candidate may provide some or all of the following fields of information on each prospective reference provider: full name, current position, current company or organization, telephone number, fax number, email addresses, and nature of relationship with the candidate. The prospective reference providers can be, but not limited to, former employers, former clients, coworkers, university professors, or friends and family members. The value to recruiter of the reference data provided by each reference provider will vary depending on the reference provider's relationship with the candidate (e.g. reference data from friends and family will carry minimum weight, while those from a former employer will have maximum value). The system may mandate the candidate to enter certain fields. For example, names and email addresses of the prospective reference providers may be mandatory for the candidate to enter if the system plans to use email as the main way to contact the reference providers.

After the candidate has provided the prospective reference providers' information in step 101, the system automatically checks and validates the provided information in step 102 to ensure that the format of the provided information is correct according to a format preset by the system. For example, the system makes sure that the prospective reference providers' names and email addresses are different from those of the candidate. The system may also make sure that those email addresses are in an email address format. If the information provided by the candidate is not in accordance with the preset format, the candidate is asked to re-enter the information. An exemplary form for the candidate to enter prospective reference providers' information is depicted in FIG. 2 which is described in greater detail below.

Once the information on the prospective reference providers is accepted, the system immediately sends a notice to each of the prospective reference providers, as shown in step 103. The notice can be sent in any form of communication, such as an electronic communication in the form of an email message. The notice identifies the candidate's name and explains the purpose of the notice. For example, the notice may explain to the prospective reference provider that the candidate has provided the recruiting management site with the prospective reference provider's contact information and requested him or her to provide reference data about the candidate. The notice, if it is in the form of an email message, may further invite the prospective reference provider to accept the request by clicking on a link in the email message. An exemplary format of such a notice is depicted in FIG. 3, which is described in greater detail below.

If the prospective reference provider accepts the request and clicks on the link, the link leads him or her to a confirmation web page on the recruitment management site. "Web page" is a document that contains text and graphical information that can be accessed through the internet through a web browser. Exemplary web pages are typically stored as HTML documents on a web server. On this confirmation web page, as indicated in step 104, the system presents the information regarding the prospective reference provider provided by the candidate in step 101.

Figure 4:
FIG. 4 is an exemplary confirmation web page including a prospective reference provider's information.

The prospective reference provider is then able to verify the information provided by the candidate. For instance, the prospective reference provider can check to ensure that the name, current position, and current company or organization are correct. On this web page, the prospective reference provider may also provide additional information about him or her. For example, the web page may have areas where the prospective reference provider may enter telephone numbers and the country where he or she works. After the prospective reference provider has finished verifying and confirming the information, he or she can formally accepts the invitation to be a reference provider for the candidate by clicking on a link on the confirmation web page. However, if the prospective reference provider chooses not to be a reference provider for the candidate, he or she may click on another link. An exemplary format of this confirmation web page is depicted in FIG. 4 which is described in greater detail below.

After the prospective reference provider has confirmed his or her information and accepted to be a reference provider for the candidate, the confirmed information is stored in a database of the system. Furthermore, the name and information of the reference provider are automatically added to the profile of the candidate, as shown in step 105 of FIG. 1. With step 105, when recruiters view the candidate's profile, they will see the names and information of the reference providers who have accepted to provide reference data regarding the candidate. Since the information of the reference providers has been checked by the system and confirmed by the reference providers, the recruiters do not have to go through that checking process and can be confident that the names and information of the reference providers are valid and correct. In addition to the information being validated by the system and the reference providers, recruiters have the option to verify the authenticity of any of the reference provider by contacting them directly using the contact information provided. The fact that the reference providers' contact details are made available to prospective recruiters, and that the candidates are made aware of this, deters candidates from attempting to enter false or fictitious information of reference providers.

Figure 5:
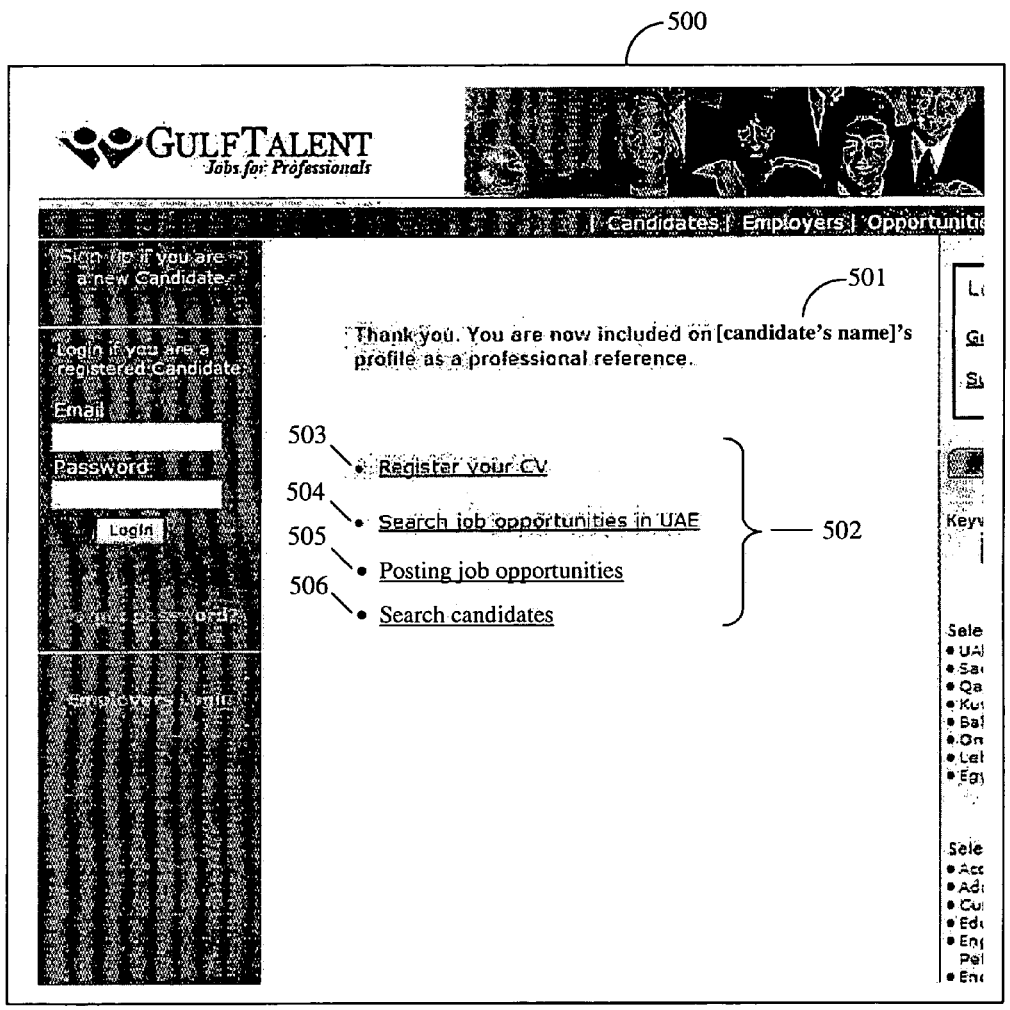
FIG. 5 is an exemplary invitation web page inviting a reference provider to participate as a candidate after the prospective reference provider has accepted to be a reference provider.

In step 106, after the reference provider has confirmed his or her information and accepted to be a reference provider for the candidate, the system then advantageously presents the reference provider with an invitation web page that invites the reference provider to participate as a candidate or a recruiter on the recruitment site. Specifically, the invitation web page may include a link that invites the reference provider to click on to register his or her C.V. on the system. The invitation web page may also include a link that invites the reference provider to click on to search for available positions. In addition, the invitation web page may also include one or more links that invite the reference provider to participate as a recruiter to post job openings or search for employment candidates on the site. An exemplary invitation web page is depicted in FIG. 5 which is described in greater detail below.

In step 107, after the reference provider has accepted to be a reference provider for the candidate, the system sends the candidate a notice informing that the reference provider nominated by the candidate has accepted to be a reference provider. The system also sends the reference provider a notice confirming that he or she has been listed as a reference provider on the profile of the candidate. For example, the notice sent to the reference provider may state, "Thank you for your confirmation. You are now included on [candidate's name]'s profile as a reference provider." The notice may be in any form of communication, such as an electronic communication in the form of an email message.

Referring again to step 104, if the prospective reference provider chooses not to be a reference provider for the candidate, he or she may click on a link which indicates that he or she will not be a reference provider. When the prospective reference provider clicks on this link, he or she will be presented with another invitation web page. This invitation web page informs the prospective reference provider that he or she will not be listed as a reference provider for the candidate.

Figure 6:
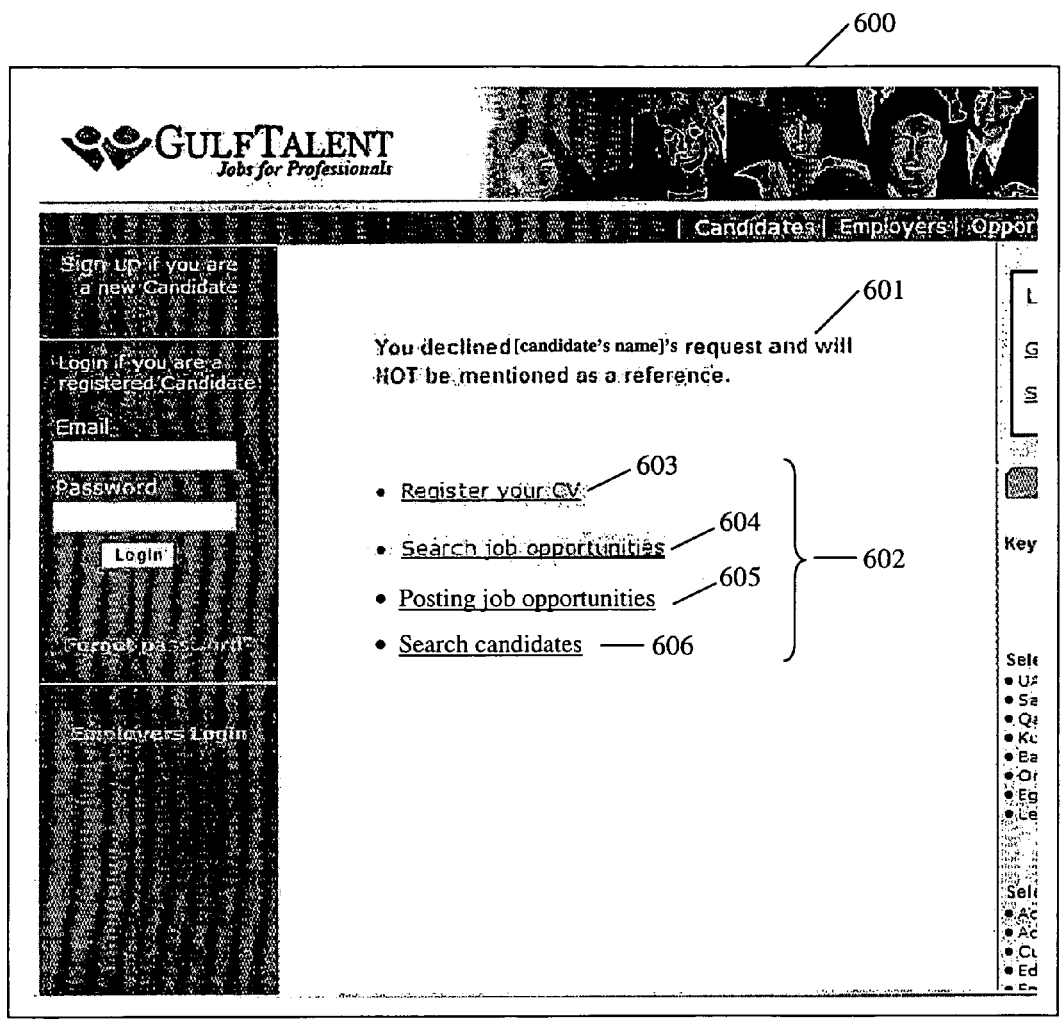
FIG. 6 is an exemplary invitation web page inviting a prospective reference provider to participate as a candidate after the prospective reference provider has declined to be a reference provider.

However, this invitation web page also advantageously includes links that invite the prospective reference provider to participate as a candidate or a recruiter on the site. For instance, the invitation web page includes a link that allows the prospective reference provider to register his or her C.V. The invitation web page may also include a link that allows the prospective reference provider to search for recruited positions in the database of the site. In addition, the invitation web page may also include one or more links that invite the reference provider to participate as a recruiter to post job openings or search for employment candidates on the site. An example of that invitation web page is depicted in FIG. 6 which is described in greater detail below.

FIG. 2 shows an exemplary form 201 provided by the system for a candidate to enter information of his or her prospective reference providers. FIG. 2 shows a table 205 including three rows and five columns of blank boxes for the candidate to fill in the prospective reference providers' information. The three rows of boxes indicate that the candidate may enter up to three prospective reference providers. The five columns are five fields of information that the candidate can fill in for each prospective reference provider. They are: "Full Name," "Position," "Company," "Email Address," and "Relationship with you (Current or Previous)." To assist the candidate, the box "Relationship with you" 210 may include a drop-down menu which allows the candidate to select a type of relationship. The menu may include, for example, Supervisor/Manager, Colleague, Client/Business Partner, Tutor/Professor, and Friend or Family. In addition to the blank boxes, the form also has a note which informs the candidate that the prospective reference providers listed by the candidate will receive an email inviting them to accept to be reference providers.

The form may contain a link, such as the link "What they will see" shown in FIG. 2, for the candidate to view the email message being sent to the prospective reference providers. The form may also inform the candidate that the email addresses of the prospective reference providers may not be changed at a later time. The form may also inform that when the prospective reference providers accept to be reference providers, their information will be made available for prospective recruiters. This notice will help deter the candidate from attempting to enter false or fictitious email addresses and other information regarding the prospective reference providers. After the candidate has finished filling out the form, he or she can click on the "Invite References" block 215 to submit the prospective reference providers' information. The table in FIG. 2 is only illustrative. It may contain more or less rows and columns of blank boxes for the candidate to enter. It may also be in an alternative format.

FIG. 3 depicts an exemplary format of a notice sent by the server to invite a prospective reference provider to be a reference provider for the candidate. The notice in FIG. 3 is in the form of an email message 300 which includes portions 301, 302, and 303. Portion 301 is a greeting portion which identifies the recipient, in this case the prospective reference provider. Portion 303 identifies the sender, in this case the recruiting management site. Portion 302 in the middle section is the main portion which identifies the candidate's name and explains the purpose of the notice. Specifically, it explains that the candidate has provided the recruiting management site with the prospective reference provider's contact information and requested him or her to be a reference provider for the candidate. The main portion 302 further asks the recipient to click on a link "click here" 304 if he or she wants to accept to provide reference data regarding the candidate. It is understood that the arrangement of the portions 301-303 of the email message 300 and the content of the portions herein are only for illustrative purposes; they can be tailored to any format by the recruitment site.

FIG. 4 shows an exemplary confirmation web page 400 for step 104 in FIG. 1. The confirmation web page 400 shows the information that the candidate has provided to the system about the prospective reference provider, including the full name, email address, current position and company, and the relationship with the candidate. The reference provider now may edit the presented information. However, the email address of the reference provider is not editable by the reference provider. One of the reasons is to avoid any discrepancies from the candidate. For example, it avoids the scenario where the candidate may enter an email address of someone who pretends to be the reference provider to enter the evaluations, and that person then, after having entered the evaluations, changes the email address to that of the actual reference provider.

The confirmation web page 400 in FIG. 4 may also requests the reference provider to provide information in addition to the information given by the candidate. For example, in FIG. 4, the web page 400 has blank boxes 405 and 410 for the reference provider to enter a phone number and the country where he or she works, respectively. Additionally, on this page, the reference provider can formally confirm that he or she knows the candidate and accepts to provide reference data by clicking on the "Confirm" block 420. Alternatively, he or she can also choose not to be a reference provider for the candidate by clicking on a link 415 that states, "Sorry, I cannot provide a reference for this person."

FIG. 5 depicts an exemplary invitation web page 500 after the prospective reference provider has clicked on the "Confirm" block 420 in FIG. 4. As shown in FIG. 5, the invitation web page 500 includes "Thank you" portion 501 and invitation portion 502. The "Thank you" portion 501 includes a message that thanks the reference provider for accepting to be a reference provider for the candidate and indicates that the reference provider's name will be listed on the candidate's profile. Invitation portion 502 presents exemplary link options which invite the reference provider to participate as a candidate on the site. Specifically, portion 502 includes links "Register your CV" 503, "Search job opportunities" 504, "Posting job opportunities" 505, and "Search candidates" 506. If the reference provider clicks on "Register your CV" 503, he or she is led to a registration page where he or she can sign up as a candidate on the recruitment site and enter resume information. If the reference provider clicks on "Search job opportunities" 504, he or she can search for advertised opportunities available in the database of the site. If the reference provider clicks on "Posting job opportunities" 505, he or she can register and post job openings on the site. If the reference provider wants to search for candidates registered on the site, he or she may click on "Search candidates" 506.

FIG. 6 depicts an example of an invitation web page 600 after the prospective reference provider clicks on the link "Sorry, I cannot provide a reference for this person" 415 in FIG. 4. Invitation web page 600 includes portions 601 and 602. Portion 601 includes a statement indicating that the reference provider has declined the request and his or her name will not be listed on the candidate's profile as a reference provider. As an example, portion 601 in FIG. 6 states, "You declined [candidate's name]'s request and will NOT be mentioned as a reference." Portion 602 presents link options which invite the prospective reference provider to participate as a candidate on the site. Portion 602 includes links "Register your CV" 603, "Search job opportunities" 604, "Posting job opportunities" 605, and "Search candidates" 606. Link "Register your CV" 603 allows the prospective reference provider to register as a candidate into the recruitment site and enter resume information. Link "Search job opportunities" 604 allows the prospective reference provider to search for advertised opportunities available in the database. If the reference provider clicks on "Posting job opportunities" 605, he or she can register and post job openings on the site. If the reference provider wants to search for candidates registered on the site, he or she may click on "Search candidates" 606.

Figure 7:
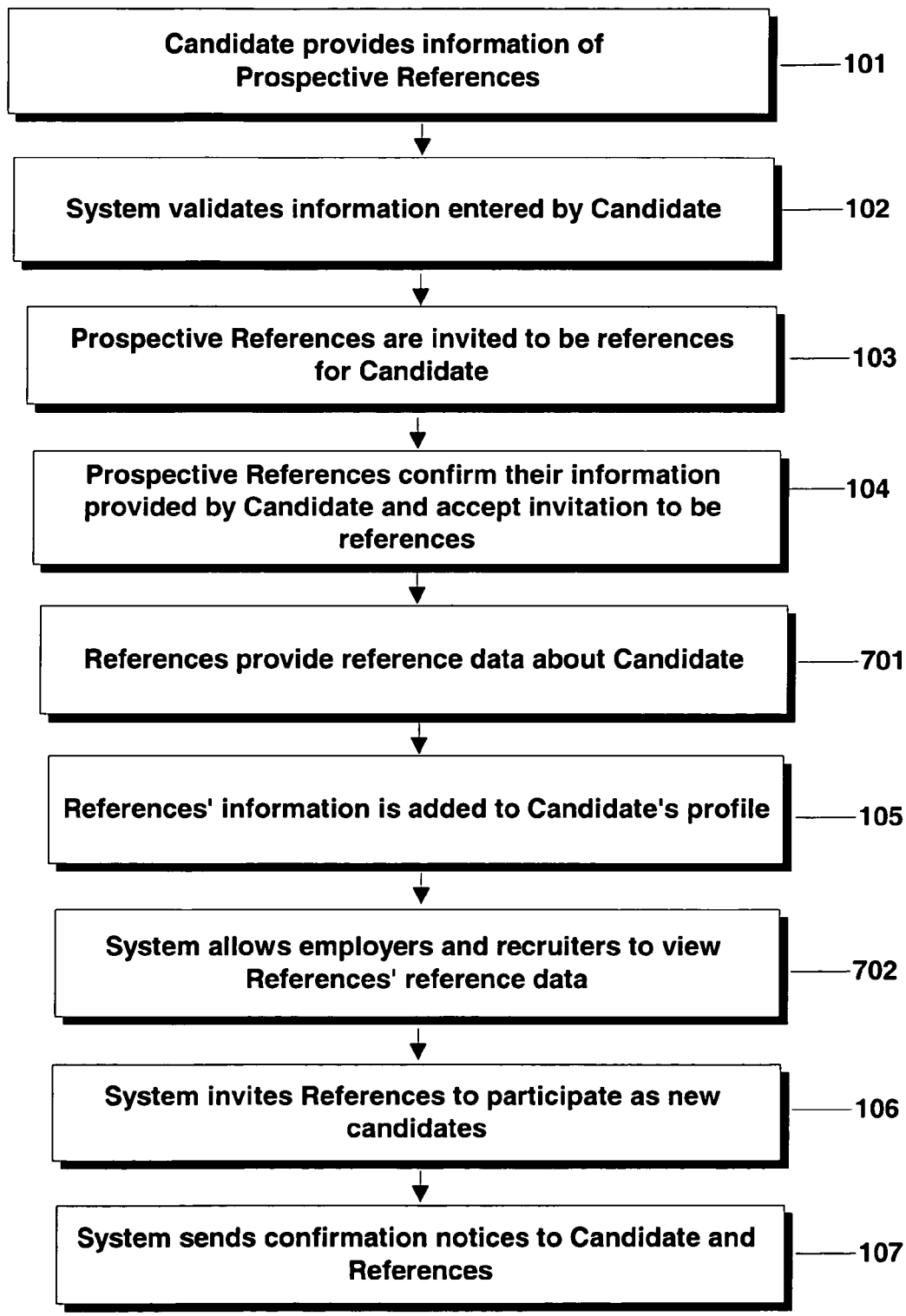
FIG. 7 is flowchart of a method according to another exemplary embodiment of the present invention.

FIG. 7 illustrates a flowchart of an exemplary method of operating an online recruitment management site according to another embodiment of the invention. FIG. 7 includes steps 101, 102, 103, 104, 105, 106, and 107 which are like numbered to and represent the same or similar function to the steps in FIG. 1. The difference between the embodiment in FIG. 1 and that in FIG. 7 is that FIG. 7 further includes steps 701 and 702. The method in FIG. 7 is now being described.

In step 101, the candidate provides the system with names and information of individuals who would be reference providers for the candidate. For instance, the system may present to the candidate a form, such as that depicted in FIG. 2 and described above, such that the candidate may provide the system with the information of prospective reference providers.

After the candidate has provided the prospective reference providers' information, the system checks and validates the provided information to ensure that the format of the provided information is correct according to a format preset by the system, as indicated in step 102. For example, the system makes sure that the prospective reference providers' email addresses are different from the email address of the candidate and are in an email address format. If the information provided by the candidate is not in accordance with the preset format, the candidate is asked to re-enter the information.

After validating the reference providers' information, the system sends a notice to each of the prospective reference providers, as indicated in step 103. The notice can be in any form of communication. For instance, the notice may be in the form of an email message, such as that shown in FIG. 3 whose details are described above. The notice identifies the candidate's name and explains the purpose of the notice. For example, the notice explains that the candidate has provided the recruiting management site with the prospective reference provider's contact information and requested him or her to provide reference data regarding the candidate. The notice further invites the prospective reference provider to click on a link, such as "click here" 304 in FIG. 3, if he or she wants to accept to provide reference data regarding the candidate.

If the prospective reference provider clicks on the link, he or she is presented with a web page which includes the information about him or her provided by the candidate. FIG. 4 illustrates an example of such web page. The description of FIG. 4 is disclosed above. On this web page, the prospective reference provider is able to verify and confirm the information provided by the candidate, as indicated in step 104. For instance, the prospective reference provider can check to ensure that the full name, current position, and current company or organization are correct. Moreover, the prospective reference provider may provide additional information about him or her, such as telephone numbers and the country where he or she works. After the prospective reference provider has finished verifying the information, he or she can formally accept the invitation to be a reference provider for the candidate by clicking on a link, such as "Confirm" block 420 in FIG. 4.

After clicking on the link to accept to be a reference provider for the candidate, the reference provider is presented with another web page where he or she can provide reference data, such as an evaluation, related to the candidate, as represented in step 701. On this web page, the system may present the reference provider at least one of the following ways to enter detailed reference data: 1) writing a letter of recommendation or evaluation of the candidate in a free-text form; 2) entering short answers to preset questions; and 3) answering preset multiple-choice questions.

After the reference provider has provided the reference data regarding the candidate, the reference data is stored in a database of the system. Furthermore, the name and contact information of the reference provider is automatically added to the candidate's profile, as shown in step 105. With step 105, when recruiters view the candidate's profile, they will see the names and contact information of the reference providers who have accepted to be reference providers and provided reference data regarding the candidate.

In step 702, the system allows the recruiters to conveniently view the reference providers' reference data regarding the candidate. There are many ways to provide the reference data to the recruiters. One way is to provide a link from the name of each reference provider listed on the candidate's profile to his or her reference data stored in the database. Alternatively, the system may add the reference data below the names of the reference providers on the candidate's profile with a link from each name to the respective reference data. With these links, the recruiters may simply click on the reference providers' names and be able to read their reference data about the candidate. Step 702 allows the recruiters to screen and select a candidate early in the hiring process.

In step 106, after the reference provider has finished providing the reference data regarding the candidate in step 701, the system invites the reference provider to participate as a candidate on the recruitment site. FIG. 5, whose details are disclosed above, shows an exemplary invitation.

In step 107, the system notifies the candidate that the reference provider nominated by the candidate has accepted to be a reference provider. Furthermore, in step 107, the system also notifies the reference provider that he or she has been listed as a reference provider on the candidate's profile.

FIG. 8 illustrates an exemplary reference questionnaire web page 801 where the reference provider may provide reference data regarding the candidate. The reference questionnaire 801 may include four portions 802, 803, 804, and 805. In portion 802, the reference provider may provide basic data regarding the candidate in the form of multiple choice and short answers. Specifically, portion 802 includes five questions: 1) "How long have you known the candidate?;" 2) "What was your relationship with the candidate?;" 3) "In which period did the candidate work at your company/organization?;" 4) "What was the candidate's position/job title at the time he/she left your company?;" and 5) "What reason did the candidate give for leaving?" In portion 803, the reference provider may provide professional assessments of the candidate. Portion 803 may be related to whether the candidate has ever been guilty of unprofessional conduct, dishonesty, incompetence, or fraud, as shown in question 6. Portion 803 may also include questions asking whether the reference provider would recommend the candidate for a position with another employer and whether he or she would rehire the candidate, as shown in questions 7 and 8. Finally, portion 803 includes question 9, "Additional comments/explanations," where the reference provider may provide explanations or evaluations of the candidate in a free-text form. Portion 804 is a statement declaring that the data provided by the reference provider is based on his or her best judgment and to the best of his or her knowledge. After answering the questions, the reference provider can click on the "SUBMIT" portion 805 to submit the reference data. The reference questionnaire in FIG. 8 is only illustrative. It may be in an alternative format.

While the embodiments of the present invention have been described above in detail, it is to be understood that this disclosure is only illustrative and exemplary of the present invention. It is made merely for the purposes of providing a full and enabling disclosure of the invention. Those persons skilled in the art would readily understand that many embodiments, modifications, adaptations, variations, or equivalent arrangements can be made from the above disclosure of the invention without departing from the spirit and scope of the invention. Therefore, the foregoing disclosure is not intended to be construed or to limit the present invention only to foregoing disclosed embodiment or otherwise to exclude any other such embodiments, modifications, adaptations and equivalent arrangements.

What is claimed is:

1. A method for operating a network accessible recruitment computer server that supports a recruitment service, the recruitment computer server storing a candidate's profile and at least one reference provider's contact information, said method being performed by the recruitment computer server and comprising the steps of:
    transmitting over a network to said at least one reference provider a request initiated by said candidate to be identified as a reference for said candidate;
    receiving a response from said reference provider, said response indicating one of an acceptance or declining as to said request; and
    providing an invitation to said reference provider to participate as a candidate or recruiter in said recruitment service.

2. The method of claim 1, wherein said response indicates an acceptance to the request, further comprising the steps of:
    receiving data from said reference provider related to said candidate;
    adding contact information for said reference provider on said candidate's profile; and
    providing a link from said reference provider's contact information on said candidate's profile to said received data,
    wherein said candidate's profile, said reference provider's contact information and said received data may be viewed by a recruiter via the recruitment computer server.

3. The method of claim 2, wherein said data is in at least one of the following forms: free-text entry; answers to preset questions; or answers to preset multiple-choice questions.

4. The method of claim 3, further comprising the steps of:
    sending a notice to said candidate that said reference provider has agreed to be a reference provider; and
    sending a notice to said reference provider that said reference provider has been listed as a reference provider for said candidate.

5. The method of claim 1, wherein the invitation invites said reference provider to perform one or more of the following: register as a new candidate, search for candidate opportunities, enter available opportunities for candidates, or search for candidates.

6. The method of claim 1, wherein said request further invites said reference provider to edit contact information about said reference provider that is provided by said candidate and transmitted by said recruitment computer sever with said request.

7. The method of claim 6, further comprising the step of receiving said contact information about said reference provider from said candidate.

8. The method of claim 2, further comprising the steps of:
    sending a notice to said candidate that said reference provider has agreed to be a reference provider; and
    sending a notice to said reference provider that said reference provider has been listed as a reference provider for said candidate.

9. The method of claim 1, wherein the response indicates that said reference provider has declined the request, further comprising the step of:
    sending a notice to said reference provider confirming that said reference provider has declined to be a reference provider for said candidate.

10. The method of claim 1, wherein said recruitment service is used for employment purposes.

11. The method of claim 6, wherein said contact information includes an email address of said reference provider provided by said candidate, and said email address is not editable by said reference provider in said response to said request.

12. The method of claim 8, wherein said request enables said reference provider to edit said contact information for said service provider and an email address of said reference provider in said contact information is provided by said candidate and is not editable.

13. A computer program product, comprising a computer-usable medium having computer-readable instructions embodied therein, the computer-readable program code adapted to be executed on a network accessible recruitment computer server to implement a method for operating a network accessible recruitment computer server that supports a recruitment service, the recruitment computer server storing a candidate's profile and at least one reference provider's contact information, said method being performed by the recruitment computer server and comprising the steps of:
    transmitting over a network to said at least one reference provider a request to be identified as a reference for said candidate;
    receiving a response from said reference provider, said response indicating one of an acceptance or declining as to the request; and
    providing an invitation to said reference provider to participate as a candidate or recruiter in said recruitment service.

14. The computer program product of claim 13, wherein when the response indicates an acceptance to the request, the method implemented on the recruitment computer server further comprises the steps of:
    receiving data from said reference provider related to said candidate;
    adding said reference provider's contact information on said candidate's profile; and
    providing a link from said reference provider's contact information on said candidate's profile to said received data,
    wherein said candidate's profile, said reference provider's contact information and said received data may be viewed by a recruiter via the recruitment computer server.

15. The computer program product of claim 14, wherein the method implemented on the recruitment computer server further comprises the steps of:

sending a notice to said candidate that said reference provider has agreed to be a reference provider; and sending a notice to said reference provider that said reference provider has been listed as a reference provider for said candidate.

16. The computer program product of claim 14, wherein said request further invites said reference provider to edit contact information about said reference provider that is provided by said candidate and transmitted by said recruitment computer sever with said request.

17. The computer program product of claim 13, wherein the response indicates that said reference provider has declined the request, the method implemented on the recruitment computer server further comprising the step of sending a notice to said reference provider confirming that said reference provider has declined to be a reference provider for said candidate.

18. The computer program product of claim 16, wherein said contact information includes an email address of said reference provider provided by said candidate, and said email address is not editable by said reference provider in said response to said request.

* * * * *